United States Patent [19]

Tanaka

[11] Patent Number: 5,140,475
[45] Date of Patent: Aug. 18, 1992

[54] TAPE RECORDER WITH AUTOMATIC PRE-REPRODUCTION TAPE SLACK ELIMINATING FUNCTION

[75] Inventor: Shinsaku Tanaka, Tokyo, Japan

[73] Assignee: Tanashin Denki Co., Ltd., Tokyo, Japan

[21] Appl. No.: 802,707

[22] Filed: Dec. 6, 1991

Related U.S. Application Data

[63] Continuation of Ser. No. 565,457, Aug. 10, 1990, abandoned.

[30] Foreign Application Priority Data

Dec. 14, 1989 [JP] Japan ................................. 1-324469

[51] Int. Cl.⁵ ............................................. G11B 15/48
[52] U.S. Cl. ................................. 360/74.3; 360/137; 360/96.1; 360/96.3; 242/204
[58] Field of Search ............ 360/74.3, 137, 96.1–96.6; 242/204–206

[56] References Cited

U.S. PATENT DOCUMENTS

| | | | |
|---|---|---|---|
| 4,209,145 | 6/1980 | Erickson | 360/74.3 |
| 4,329,720 | 5/1982 | Kodama | 360/74.3 |
| 4,614,315 | 9/1986 | Gerrits et al. | 360/74.3 |
| 4,748,521 | 5/1988 | Osawa et al. | 360/137 |

FOREIGN PATENT DOCUMENTS

| | | | |
|---|---|---|---|
| 58-64661 | 4/1983 | Japan | 360/74.3 |
| 58-182146 | 10/1983 | Japan | 360/74.3 |
| 60-55542 | 3/1985 | Japan | 360/74.3 |
| 1-27135 | 8/1989 | Japan | . |

Primary Examiner—Aristotelis M. Psitos
Assistant Examiner—Alfonso Garcia

[57] ABSTRACT

A tape recorder is provided with a device for eliminating any slack of a tape inside a tape cassette before initiation of a reproducing operation. In the state that forward movement of a head mounting plate is inhibited by a lock member and rotation of one of paired reel spindles is inhibited by a brake, a reel gear of the other reel spindle is driven via a slack eliminating gear supported on a movable member. When the tape inside the tape cassette has been taken up over a length equal to the slack on the other reel spindle and the other reel spindle has been stopped, the slack eliminating gear receives a reaction force from the reel gear to move the movable member. This movement of the movable member releases the lock member so that the head mounting plate is allowed to move substantially further and the brake is also disengaged from the one reel spindle to start a reproducing operation.

10 Claims, 8 Drawing Sheets

TAPE RECORDER WITH AUTOMATIC PRE-REPRODUCTION TAPE SLACK ELIMINATING FUNCTION

This application is a continuation of application Ser. No. 07/565,457, filed on Aug. 10, 1990, now abandoned.

BACKGROUND OF THE INVENTION

1. Field of the Invention

This invention relates to a tape tensioning device for a tape recorder which operates, when a tape cassette in which a tape is slack is loaded, to automatically eliminate any slack in the tape to permit subsequent starting of a reproducing action.

2. Description of the Related Art

When a tape cassette is left unused for a considerable time interval, the magnetic tape within the cassette may unreel into a slacking fractional condition due to vibrations of the cassette from the outside and so forth. If a cassette tape in such condition is loaded into a tape recorder and used, then there is the possibility that on starting the slack tape may wind itself around a capstan or a pinch roller and the tape or the tape recorder may be damaged thereby.

Numerous proposals have been made to date with a view toward overcoming the above problem. However, such prior art techniques either try to improve mechanisms around a pinch roller or a capstan so as to prevent a slack tape from entering between the pinch roller and the capstan or try to detect it without a moment's delay that a tape has wound itself around a pinch roller or a capstan.

The former has a drawback that it cannot prevent a tape from entering between a pinch roller and a capstan with certainty, while the latter only notifies of the fact that a tape has wound itself around a pinch roller or a capstan and does not make a fundamental countermeasure. Further, since neither of them tensions a tape, it is cumbersome that, when there is tape slack or when a tape winds itself around a pinch roller or a capstan, the tape recorder must be stopped by hand promptly to cope with the situation.

Furthermore, Japanese Utility Model Publication No. 1-27135 discloses the concept that when a tape slack eliminating action is made, only braking of the tape take-up side is released while the reel spindle of the tape supply side remains braked.

However, with this prior art device, an additional operating action called "tape slack eliminating action" is needed to tension the slack tape, which is laborious and time-consuming.

SUMMARY OF THE INVENTION

It is therefore an object of this invention to provide a tape tensioning device, for a tape recorder, in which when a tape cassette is loaded in a cassette holder, any tape slack can be automatically eliminated, without any additional operating action, to permit subsequent starting of a reproducing action.

According to a first aspect of this invention, there is provided a tape tensioning device for a tape recorder of the type that a pair of reel spindles and a motor are provided and the motor starts to rotate upon movement of a cassette holder from a cassette inserting and removing position to a cassette loading position by insertion of a tape cassette, said tape tensioning device comprising:

a resilient member;

a reciprocating member normally urged by said resilient member whereby the tape recorder is rendered operative for reproducing;

a locking means for inhibiting said reciprocating member from moving in said one direction;

a braking means for inhibiting rotation of one of the reel spindles;

a movable member provided reciprocally and, when moved in one direction, releasing said reciprocating member and the one reel spindle from said locking member and said braking means, respectively;

a gear means including a rotation transmitting gear supported on said movable member and engageable with associated gears arranged on opposite sides thereof to transmit rotation of the motor to the other reel spindle when said movable member is located in a position moved in an opposite direction; and, when the rotation of the other reel spindle is inhibited by tension of a tape, said rotation transmitting gear is moved by the rotation of the motor so that said movable member is moved in said one direction; and a cooperating means operable, in response to the movement of said reciprocating member in said one direction, to retain said movable member in a position such that said rotation transmitting gear is remote from at least one of said associated gears.

According to a second aspect of the invention, the reciprocating member is a head mounting plate.

According to a third aspect of the invention, the locking means and the braking means are formed on a common plate-like member cooperable with the movable member.

According to a fourth aspect of the invention, the cooperating means is formed on the reciprocating member.

According to a fifth aspect of the invention, the braking means is formed on the reciprocating member.

According to a sixth aspect of the invention, there is provided a tape tensioning device for a tape recorder of the type that a pair of reel spindles and a motor are provided and, when an ejection operating member is operated in one direction against the bias of a return spring, a cassette holder is moved from a cassette loading position to a cassette inserting and removing position and a tape cassette in the cassette holder is pushed backward in a removing direction and, when the tape cassette is inserted into the cassette holder, the cassette holder moves from the cassette inserting and removing position to the cassette loading position, whereby the motor starts to rotate, said tape tensioning device comprising:

a locking means for inhibiting said ejection operating member from moving in an opposite direction;

a braking means for inhibiting rotation of one of the reel spindles;

a movable member retained at a predetermined position by a resilient member and, when moving against the bias of the resilient member, releasing said ejection operating member and the one reel spindle from said locking member and said braking means, respectively;

a gear means including a rotation transmitting gear supported on said movable member and engageable with associated gears arranged on opposite sides thereof to transmit rotation of the motor to the other reel spindle when said movable member is located in the predetermined position; and, when the rotation of the other reel spindle is inhibited by tension of a tape, said rotation transmitting gear is moved by the rotation of the motor so that said movable member is moved against the bias of said resilient member; and a cooperating means operable, in response to the movement of said ejection operating member in the opposite direction, to retain said movable member in a position such that said rotation transmitting gear is remote from at least one of said associated gears.

According to a seventh aspect of the invention, the braking means is formed on the head mounting plate in the tape transmitting device of the sixth aspect of the invention.

According to an eighth aspect of the invention, the cooperating means is formed on the movable member in the tape transmitting device of the sixth aspect of the invention.

With the first arrangement, when a cassette holder is moved to a cassette loading position as a tape cassette is inserted in the cassette holder, the motor starts to rotate. At that time, if there is any slack in the tape within the cassette, the rotating force of the motor is transmitted to one reel spindle via the rotation transmitting gear, with the other reel spindle braked.

Since the rotation of the other reel spindle is inhibited due to the tension of the tape after the tape within the cassette is wound up by such a length as to eliminate any possible slack, the rotation transmitting gear causes the movable member to move under the rotating force of the motor. The reciprocating member is thereby released from the locking means to allow the reciprocating member to move forwardly so that braking of the one reel spindle is released. As a result, the rotating transmitting gear is held out of a gear rotation transmitting path by the cooperating means to start the reproducing action.

With the second arrangement, when any slack in the tape is eliminated, the head mounting plate is moved forwardly to start the reproducing action.

With the third arrangement, when the movable member is moved as any slack in the tape is eliminated, the cooperating means is moved to inhibit the forward movement of the reciprocating member and to release the braking of the reel spindle.

With the fourth arrangement, when the reciprocating member is moved forwardly as any slack in the tape is eliminated, the rotation transmitting gear is held out of the gear rotation transmitting path by the cooperating means on the reciprocating member to perform the reciprocating action.

With the fifth arrangement, when the reciprocating member is moved forwardly as any slack in the tape is eliminated, the reel spindle is released from the braking means for rotation to perform the reproducing action.

With the sixth arrangement, when the movable member is moved as any slack in the tape is eliminated, the ejection operating member is released form the locking means and is thereby moved backwardly under the resilient force of the resilient member to start the reproducing action.

With the eighth arrangement, when the ejection operating member is moved backwardly as any slack in the tape is eliminated, the rotation transmitting gear is held out of the gear rotating transmitting path by the cooperating means on the ejection operating member to perform the reproducing action.

The above and other advantages, features and additional objects of this invention will be manifest to those versed in the art upon making reference to the following detailed description and the accompanying drawings in which several preferred structural embodiments incorporating the principles of this invention are shown by way of illustrative examples.

DETAILED DESCRIPTION

The principles of this invention are particularly useful when embodied in a tape tensioning device (hereinafter also called "device") for a tape recorder.

Figure 1:
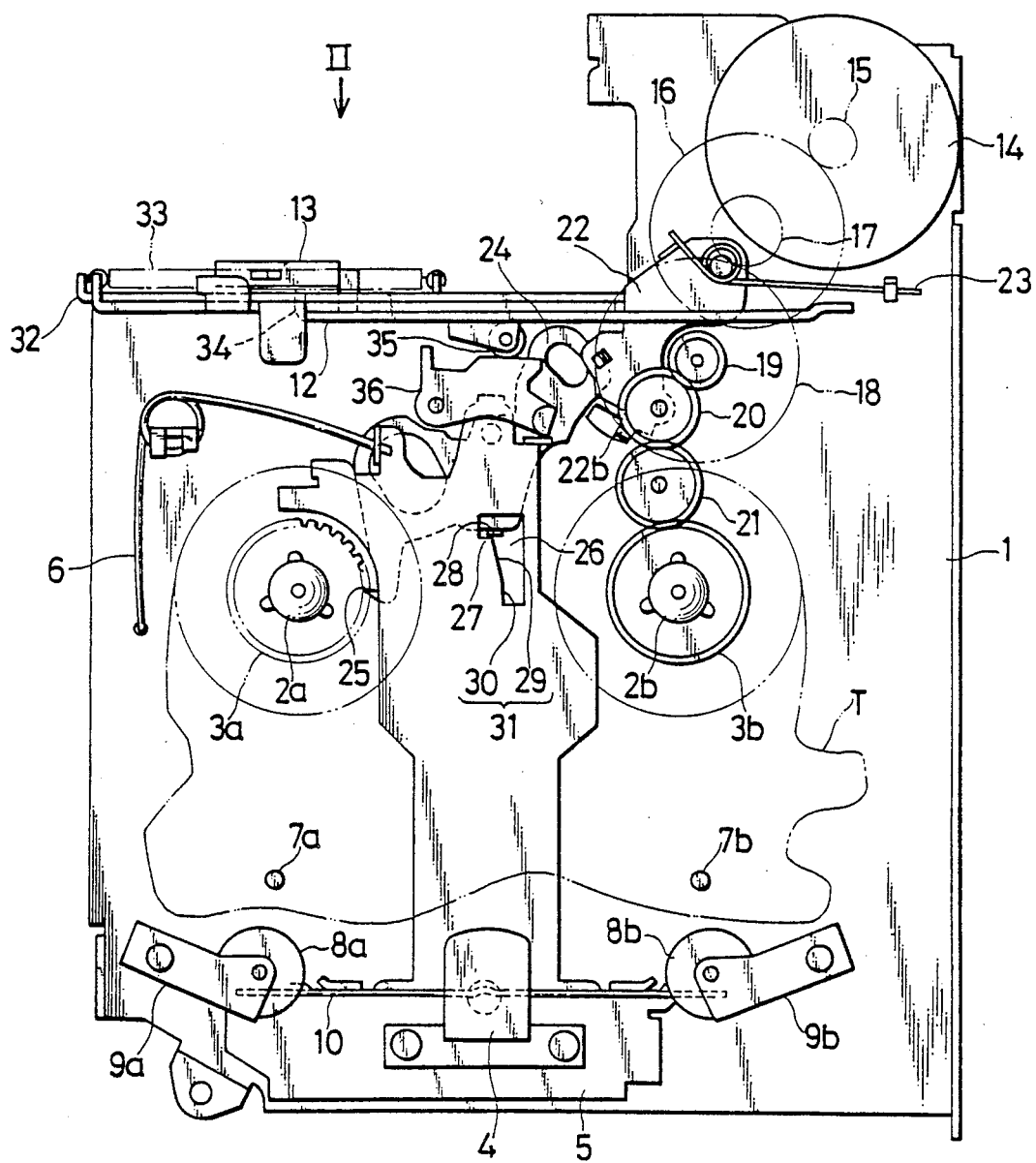
FIG. 1 is a plan view showing a tape tensioning device according to a first embodiment of this invention.

FIGS. 1 through 5 show a first embodiment of the device. As shown in FIG. 1, a pair of horizontally spaced reel spindles 2a, 2b is mounted on a base 1 of the tape recorder, and a reel gear 3a, 3b is attached to a lower portion of each of the reel spindles 2a, 2b. On the pair of reel spindles 2a, 2b a tape cassette C (FIGS. 2 and 3) is loaded.

On the base 1 of the tape recorder, a head mounting plate (also called "reciprocating member") 5, on which a magnetic head 4 is mounted, is vertically reciprocatingly movably supported and is normally urged upwardly (forwardly) by a torsion spring (also called "resilient member") 6.

In FIG. 1, 7a, 7b designate a pair of capstans; and 8a, 8b, pinch rollers corresponding to the respective capstans 7a, 7b. A pair of pinch roller arms 9a, 9b supporting the respective pinch rollers 8a, 8b is connected to the head mounting plate 5 via a torsion spring 10; in response to the upward (forward) movement of the head mounting plate 5, the pinch roller arms 9a, 9b pivotally move so as to bring the pinch rollers 8a, 8b toward the corresponding capstans 7a, 7b. The torsion spring 10 is operatively connected to a tape feed direction change-over means (not shown) for being moved leftwardly or rightwardly to press one of the pinch rollers 8a, 8b selectively against the corresponding capstan 7a, 7b when the head mounting plate 5 is located in a position in which a reproducing action of the tape recorder is to be performed.

On the upper side of the base 1, a cassette holder 11 is vertically movably mounted via a connecting plate 11a. In its upper position (cassette inserting and removing position), the cassette holder 11 allows the cassette C to be inserted in or removed from the cassette holder 11. In this upper position, if the cassette C is inserted in the cassette holder 11 rightwardly in FIG. 1, the cassette holder 11 is moved to its lower position (cassette loading position) to load the cassette C on the two reel spindles 2a, 2b.

Figure 2:
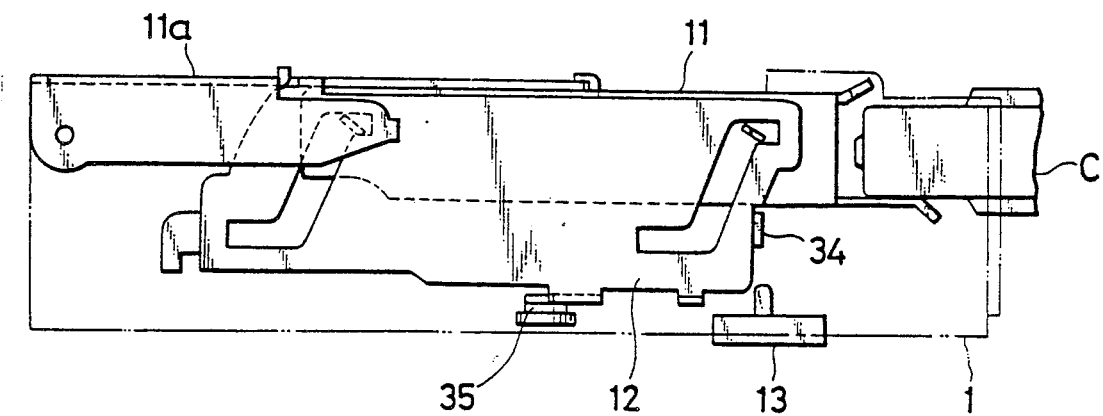
FIG. 2 is a side elevational view as viewed in the direction of arrow II of FIG. 1.
Figure 3:
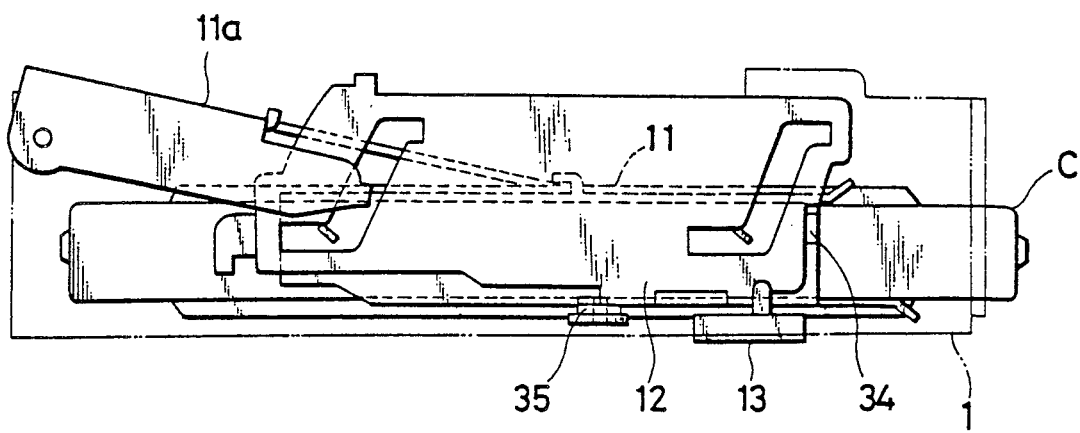
FIG. 3 is a view similar to FIG. 2, showing the operative state in which a tape cassette is loaded.

On the side (upper side in FIG. 1) edge of the base 1, a slide plate 12 is horizontally movably mounted. The slide plate 12 slides along the side edge of the base 1 in response to the movement of the cassette holder 11 (FIGS. 2 and 3). When the cassette holder 11 is moved from the cassette inserting and removing position (FIG. 2) to the cassette loading position (FIG. 3), the slide plate 12 slides so as to switch a motor switch 13 from an OFF state to an ON state.

Still in FIG. 1, 14 designates a motor for feeding the tape. When the motor switch 13 is switched on, namely, when the cassette holder 11 is moved to the cassette loading position, the motor 14 is thereby rendered conductive to rotate.

The rotation of the motor 14 is transmitted to the right reel gear 3b via a rotation transmitting path which is composed of gears 15, 16, 17, 18, 19, 20, 21 to drive the right reel spindle 2b.

The gear 20 is a rotation transmitting gear supported on a movable member 22 for eliminating slack in the tape. The movable member 22 is pivotally movably mounted on the base 1 and is normally held in a predetermined position of FIG. 1 by a torsion spring (also called "resilient member") 23 to locate the rotation transmitting gear 20 in the rotation transmitting path. As the movable member 2 is pivotally moved clockwise in FIG. 1 against the bias of the torsion spring 23, the rotation transmitting gear 20 is moved off the rotation transmitting path.

A plate-like member 24 is pivotally movably mounted on the base 1. The plate-like member 24 is in engagement with the movable member 22 for movement in response thereto; 22a, 24a in FIGS. 4 and 5 designate mutual engaging portions of the movable member 22 and the plate-like member 24. The plate-like member 24 includes a braking means 25 engageable with the left reel gear 3a to inhibit the rotation of the corresponding reel spindle 2a, and a locking means 28 engageable with a stepped portion 27 of an opening 26 in the head mounting plate 5 to inhibit the upward (forward) movement of the head mounting plate 5.

Figure 4:
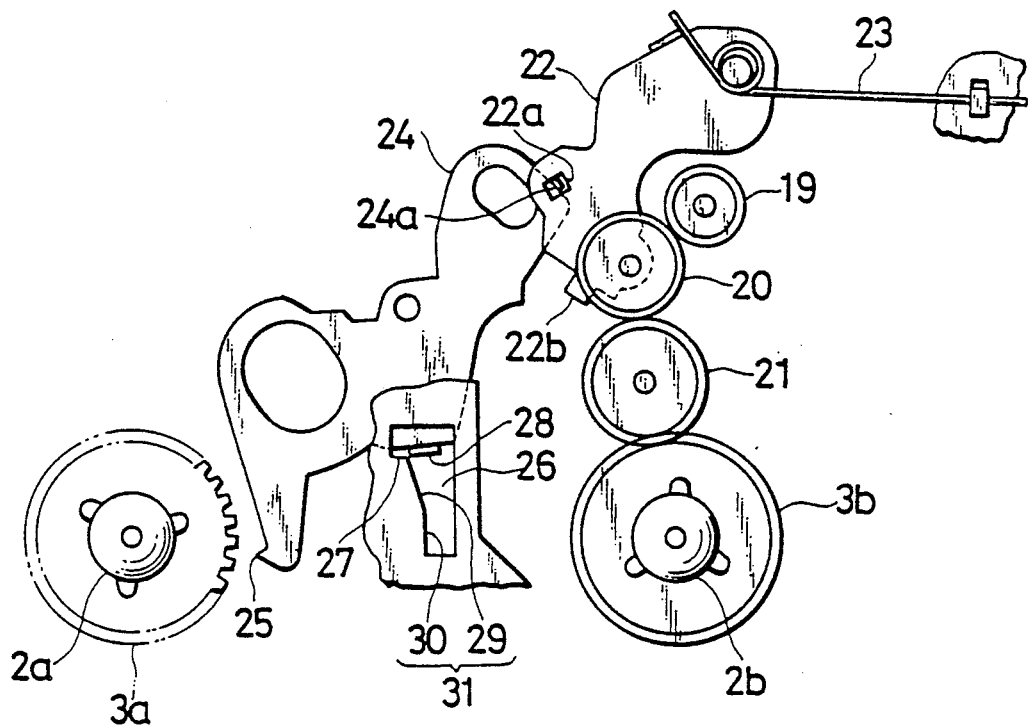
FIGS. 4 and 5 are partial plan views showing the mode of operation of the device.
Figure 5:
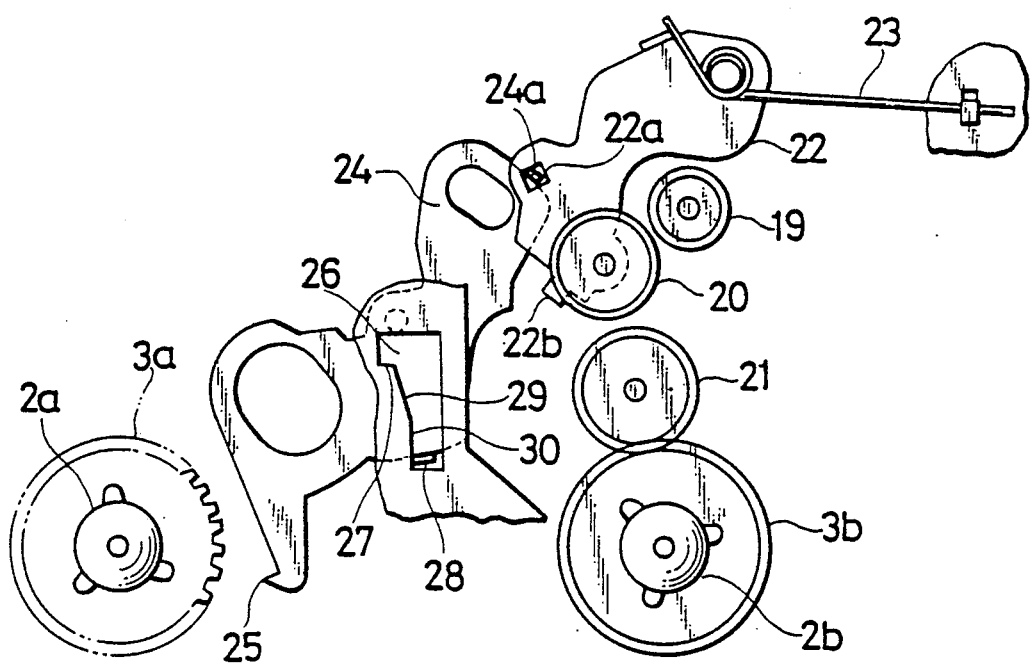

As shown in FIGS. 1, 4 and 5, the edge of the opening 26 has a sloping surface 29 contiguous to the stepped portion 27, and a parallel surface 30 contiguous to the sloping surface 29; these two surfaces 29, 30 jointly constitute a cooperating means 31. As the movable member 22 is pivotally moved clockwise in FIG. 1 to pivotally move the plate-like member 24 counterclockwise, the locking means 28 is disengaged from the stepped portion 27 so that the head mounting plate 5 is moved upwardly (forwardly) under the bias of the torsion spring 6. At that time, since the sloping surface 29 pushes the locking means 28 rightwardly in FIG. 1, the movable member 22 is further pivotally moved clockwise to a large extent. When the head mounting plate 5 is in the position in which the reproducing action of the tape recorder is to be performed, the locking means 28 is in engagement with the parallel surface 3 to hold the rotation transmitting gear 20 out of the rotation transmitting path, as shown in FIG. 5. 22b designates a stop mounted on the movable on the movable member 22 for restricting the depth of meshing engagement between the gear 20 and the gears 19, 21.

On the edge of the base 1 an ejection operating member 32 is mounted for reciprocating movement in parallel to the slide plate 12. The ejection operating member 32 is normally urged leftwardly in FIG. 1 under the bias of a return spring 33. Regarding the relationship between the slide 12 and ejection operating member 32, if the ejection operation member 32 is pushed rightwardly in FIG. 1 against the bias of the return spring 33, a portion of the ejection operating member 32 pushes a bent portion 34 of the slide plate 12 to move both as a unit. While the ejection operating member 32 is returning to its original position under the bias of the return spring, the slide plate 12 does not follow it.

A pressing roller 35 is supported by the slide plate 12; as the slide plate 12 is moved rightwardly in FIG. 1, the pressing roller 35 pushes the head mounting plate 5 downwardly in FIG. 1 to its original position via a pivotally movable head return plate 36.

In the position of FIGS. 1 and 2 in which the tape cassette C is not loaded, the movable member 22 is held in a predetermined position under the bias of the torsion spring 23 so that the rotation of one (left) reel spindle 2a is inhibited by the braking means 25 of the plate-like member 24 while the upward (forward) movement of the head mounting plate 5 is inhibited by the locking means 28.

Now if the tape cassette C in which a tape is slack is inserted in the cassette holder 11, the cassette holder 11 is moved to the cassette loading position to load the tape cassette C on the two reel spindles 2a, 2b. At that time, as shown in FIG. 3, the slide plate 12 is moved along with the cassette holder 11 to switch the motor switch 13 on to start the motor 14. The rotation of the motor 14 is transmitted to the reel spindle 2b via the gears 15 through 21 and the reel gear 3b so that the tape T within the cassette C is taken up on the right reel by such a length as to eliminate the slack.

Once the slack in the tape T within the cassette C has thus been eliminated, the rotation of the right reel spindle 2b is inhibited due to the tension of the tape T arising from the engagement of the braking means 25 on the left reel gear 3a, but the rotation transmitting gear 20 continues to receive the rotating force of the motor 14. Consequently the movable member 22 is moved clockwise against the torsion spring 23 to the position of FIG. 4 in which the gears 20, 21 are out of meshing engagement with each other.

As the plate-like member 24 is then pivotally moved counterclockwise in response to the pivotal movement of the movable member 22, the braking means 25 is disengaged from the reel gear 3a and, at the same time, the locking means 28 also is disengaged from the stepped portion 27 of the head mounting plate 5 so that the head mounting plate 5 is moved upwardly (forwardly) under the bias of the torsion spring 6. Thereby both the plate-like member 24 and the movable member 22 are further rotated to a large extent by the cooperating means 31 formed on the head mounting plate 5 (FIG. 5) to hold the rotation transmitting gear 20 out of the rotation transmitting path.

This upward movement of the head mounting plate 5 causes either one of the pinch rollers 8a, 8b to be pressed against the corresponding capstan 7a, 7b so that the magnetic head 4 comes in contact with the tape T. Also a rotation transmitting path (not shown), for reproducing action, which transmits the rotating force of the motor 14, selectively to one of the reel gears 3a, 3b, is constituted to start the reproducing action.

Figure 6:
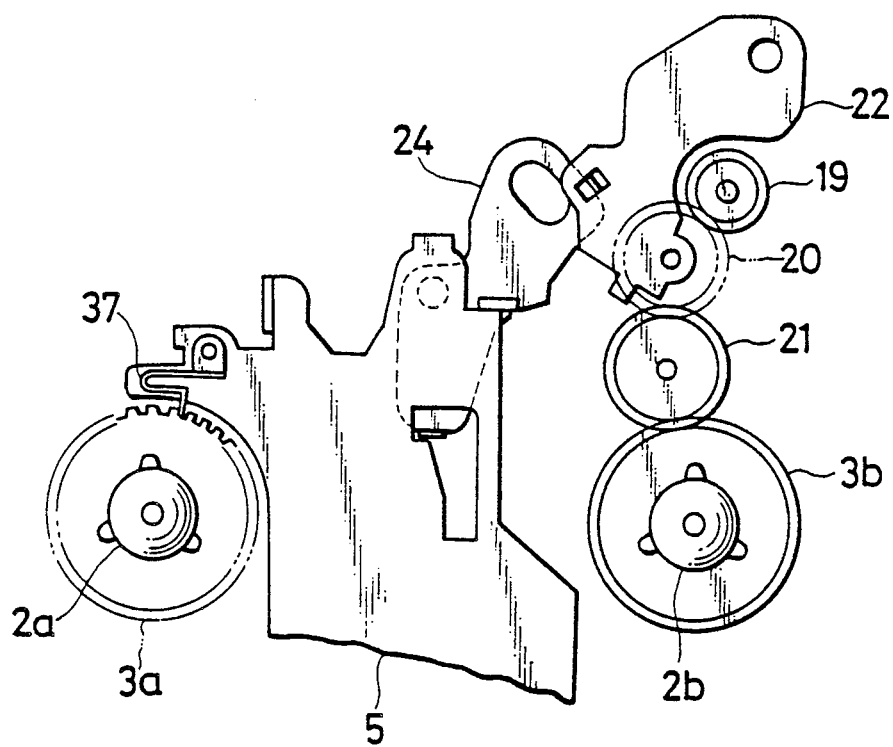
FIG. 6 is a view similar to FIGS. 4 and 5, showing a modified tape tensioning device according to a second embodiment.

In the foregoing embodiment, both the braking means 25 and the locking means 28 are formed on the plate-like member 24. Alternatively, a braking means 37 may be formed as a part of the head mounting plate 5 according to a second embodiment shown in FIG. 6, in which case it is unnecessary to provide the plate-like member 24 with a separate locking means.

FIGS. 7 through 12 show a third embodiment. In this embodiment, like the first embodiment, a pair of horizontally spaced reel spindles 2a, 2b and a pair of corresponding reel gears 3a, 3b are mounted on the base 1 of the tape recorder. Also a head mounting plate 38 on which a magnetic head 4 is mounted is mounted on the base 1 for vertical reciprocating movement and is normally urged upwardly (forwardly) by a spring 39.

A pair of capstans 7a, 7b, a pair of pinch rollers 8a, 8b and a pair of pinch roller arms 9a, 9b supporting the respective pinch rollers 8a, 8b are identical with those of the first embodiment.

Further, though there is no illustration in the drawings, the cooperative relationship between the pinch roller arms 9a, 9b and the head mounting plate 38 is identical with that in the first embodiment.

Figure 9:
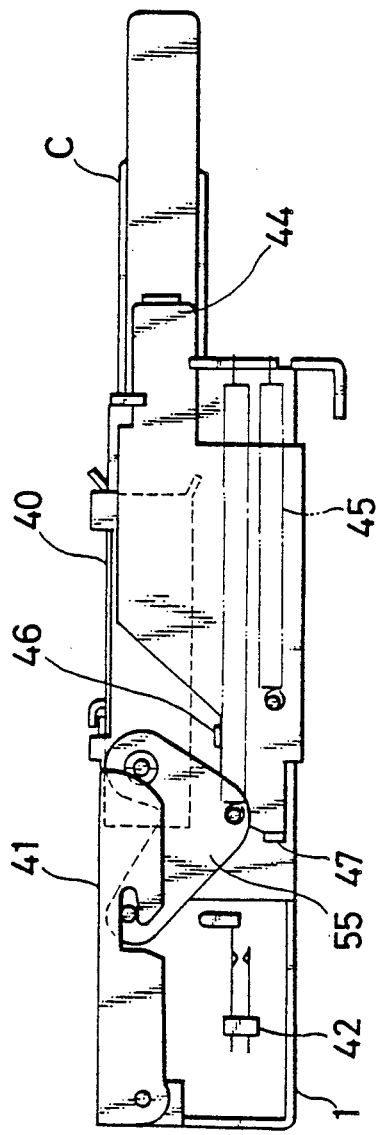
FIG. 9 is a side elevational view as viewed in the direction of arrow IX of FIG. 7.
Figure 10:
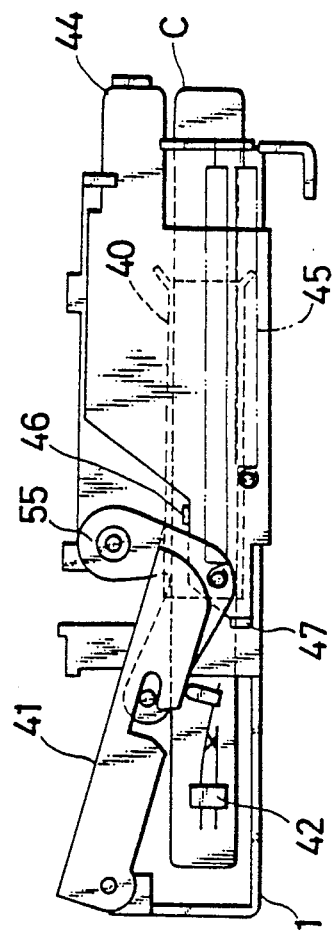
FIGS. 10 and 11 are views similar to FIG. 9, showing the manner in which the tape cassette is loaded.
Figure 11:
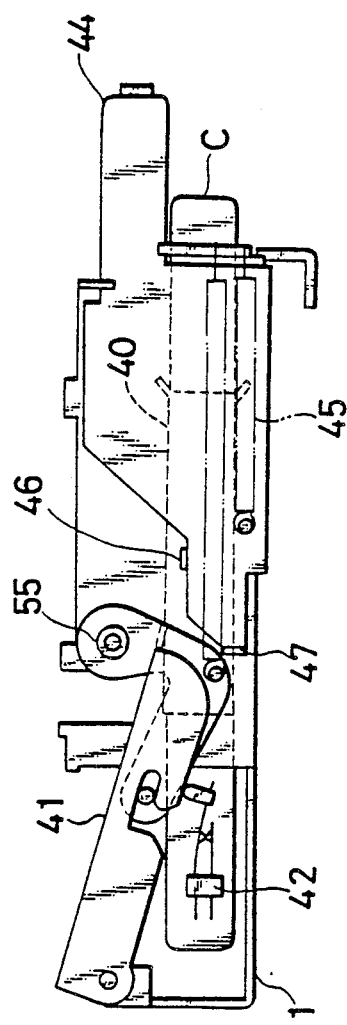

As shown in FIGS. 9 through 12, a cassette holder 40 is vertically movably supported on the upper surface of the base 1 and is movable between a cassette inserting and removing position shown in FIGS. 9 through 11 and a cassette loading position shown in FIGS. 10 and 11. When the cassette holder 40 is moved from the cassette inserting and removing position (FIG. 9) to the cassette loading position (FIG. 10) in response to the insertion of the tape cassette C, a motor switch 42 is switched from the OFF state to the ON state by a connecting plate 41 to start a motor 14 (FIG. 7) for tape feeding.

The rotation of the motor 14, like the first embodiment, is transmitted to the right reel gear 3b via the rotation transmitting path composed of gear 15 through 21 to thereby drive the right reel spindle 2b.

Figure 7:
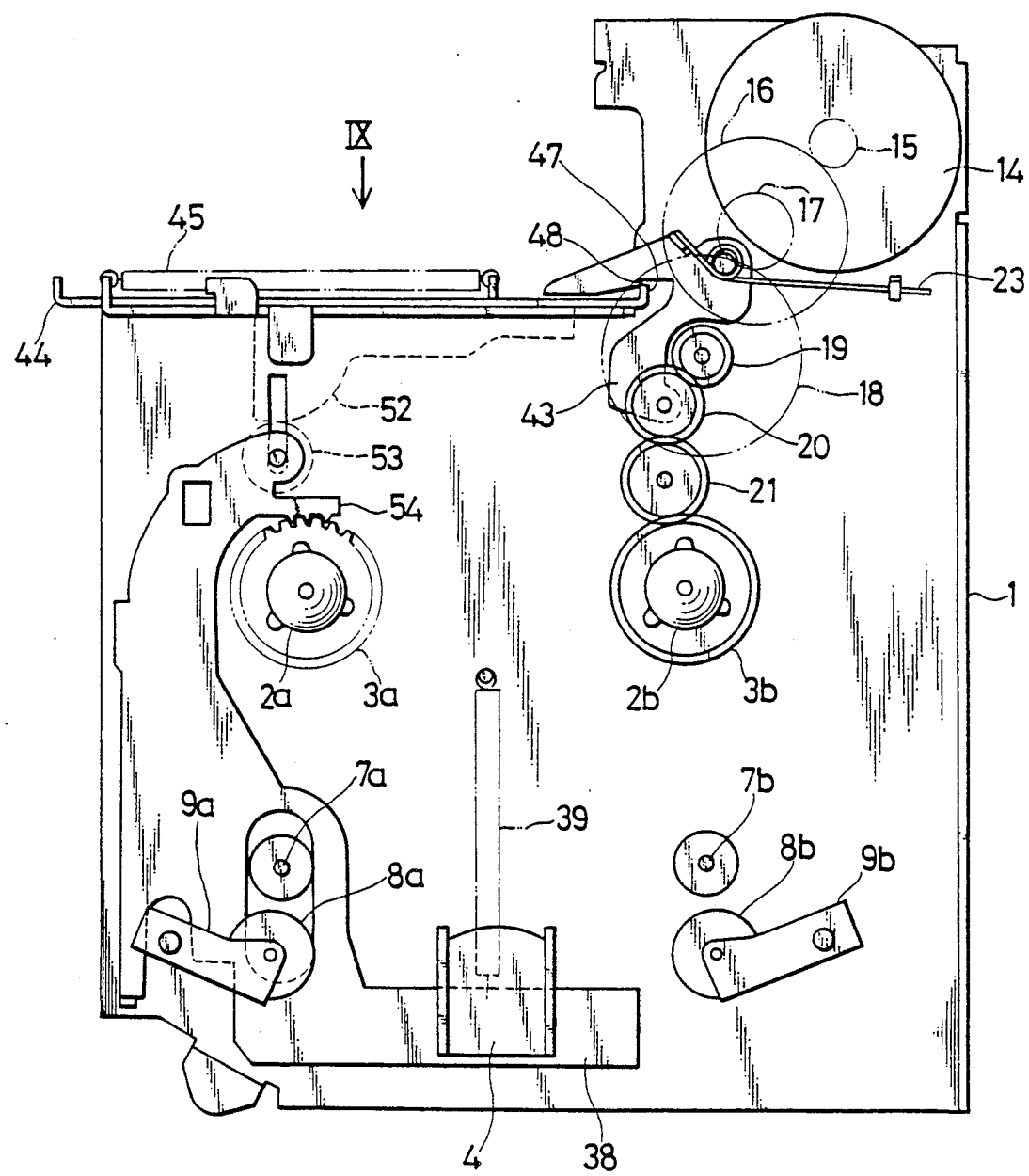
FIG. 7 is a view similar to FIG. 1, showing another modified tape tensioning device according to a third embodiment.

Like the first embodiment, movable member 43 supporting the rotation transmitting gear 20 for tape slack eliminating is pivotally movably mounted on the base 1 as shown in FIG. 7. The movable member 43 is normally held in a predetermined position of FIG. 7 by a torsion spring (resilient member) 23 to locate the rotation transmitting gear 20 in the rotation transmitting path. As the movable member 43 is pivotally moved clockwise in FIG. 1 against the bias of the torsion spring 23, the rotation transmitting gear 20 is moved off the rotation transmitting path.

On the side edge (upper side edge in FIG. 7) of the base 1, an ejection operating member 44 is mounted for horizontal reciprocating movement and is normally urged leftwardly (backwardly) in FIG. 7 by the bias of a return spring 45. As shown in FIGS. 9 through 12, the ejection operating member 44 is provided with a pushup member 46 and a claw projection 47. The pushup member 46 serve to push the cassette holder 40 upwardly from the cassette loading position (FIG. 11) to the cassette inserting and removing position (FIG. 12), while the claw projection 47 is brought into engagement with a hook-shaped locking means 48 on the movable member, as shown in FIG. 7, to inhibit the return of the ejection operating member 44.

Also the movable member 43 has a sloping surface 49 contiguous to the locking means 48 and a parallel surface 49 contiguous to the sloping surface 50; these two surfaces jointly constitute a cooperating means 51.

The ejection operating member 44 has a cam projection 52 along the lower surface of the base 1. When the ejection operating member 44 is moved forwardly, i.e., rightwardly in FIG. 7, the cam projection 52 pushes a pressing roller 53 supported on the head mounting plate 38 to return the head mounting plate 38 against the bias of the spring 39.

The head mounting plate 38 is provided with a braking means 54; when the head mounting plate 38 is in a inoperative position (in which the magnetic head 4 is remote from the tape T), the braking means 54 is brought in engagement with one reel gear 3a to inhibit the rotation of the reel spindle 2a.

With this arrangement, in the position of FIGS. 7 and 9 in which the tape cassette C is not loaded, the movable member 43 is held in a predetermined position under the bias of the torsion spring 23 so that the rotation of one reel spindle 2a is inhibited by the braking means 54, while the returning of the ejection operating member 44 is inhibited by the locking means 48 to stop the head mounting plate 38 in the inoperative position.

Now assuming that the tape cassette C having a slack tape inside is inserted in the cassette holder 40, the cassette holder 40 is moved from the cassette inserting and removing position of FIG. 9 to the cassette loading position of FIG. lo to load the tape cassette C on the two reel spindles 2a, 2b. At that time the motor switch 42 is switched on to start the motor 14, whereupon the rotation of the motor 14 is transmitted to the reel spindle 2b via the gears 15 through 21 and the reel gear 3b so that the tape T within the cassette C is taken up on the right reel by such a length as to eliminate the tape slack.

With the thus tensioned tape T in the cassette C, the rotation of the right of reel spindle 2b is inhibited by the tension of the tape T, but the rotation transmitting gear 20 continues to receive the rotating force of the motor 14. Therefore the movable member 43 is pivotally moved clockwise against the bias of the torsion spring 23, as shown in FIG. 8.

Then the claw projection 47 is disengaged from the locking means 48 on the movable member 43 to cause the ejection operating member 44 to return from the position of FIG. 10 to the position of FIG. 11 At that time, since the cam projection 52 is disengaged from the pressing roller 53, the head mounting plate 38 is moved forwardly under the bias of the spring 39 so that the braking means 54 is disengaged from the reel gear 3a to allow the reel spindle 2a to rotate.

Figure 8:
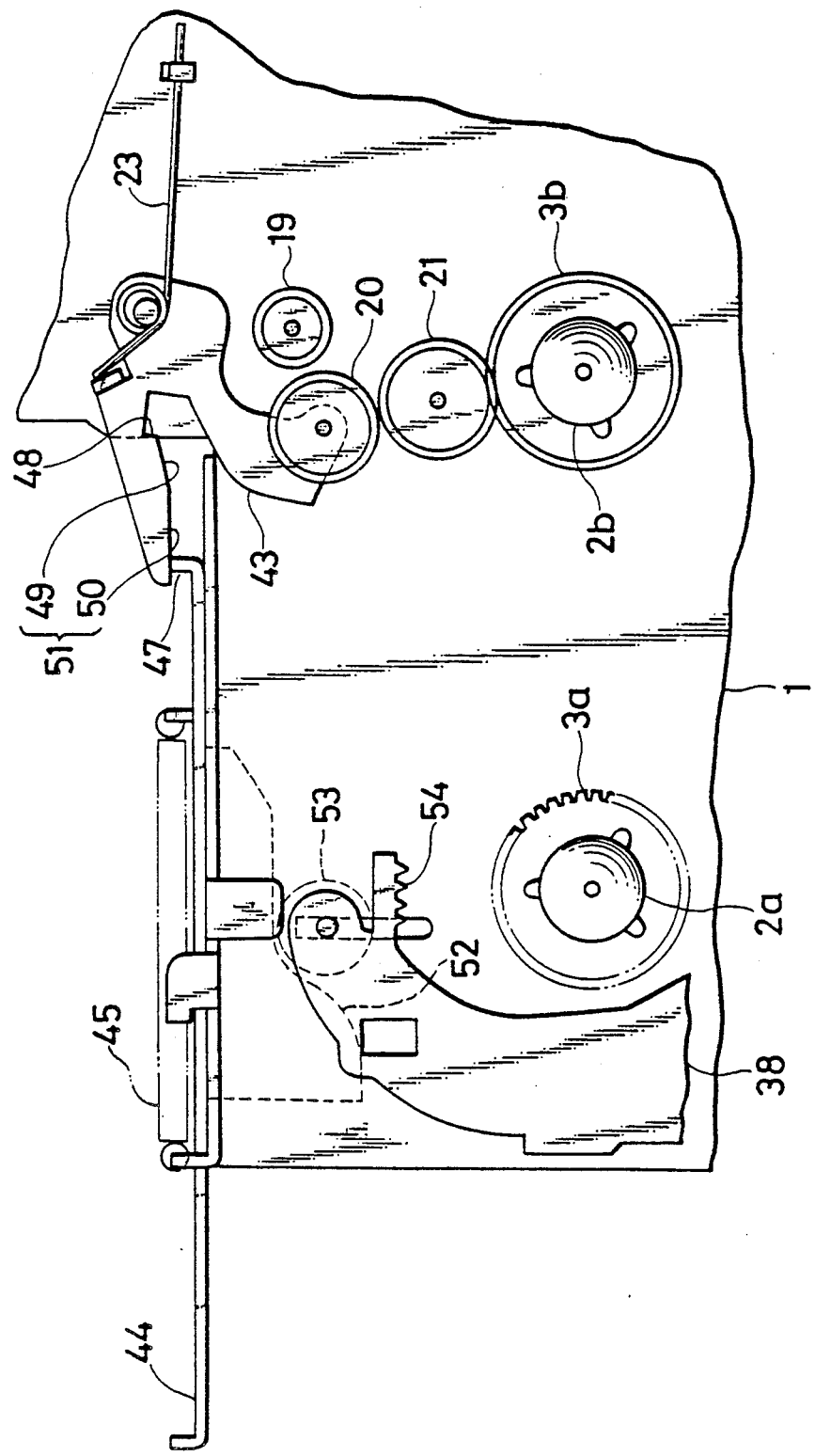
FIG. 8 is a fragmentary plan view of FIG. 6, showing the mode of operation of the third embodiment.

After having been disengaged from the locking means 48 in response to the return of the ejection operating member 44, the claw projection 47 slides on the sloping surface 49 to pivotally move the movable member 43 further to a large extent and finally comes in contact with the parallel surface 50 to hold the rotation transmitting gear 20 off the rotation transmitting path (FIG. 8).

Figure 12:
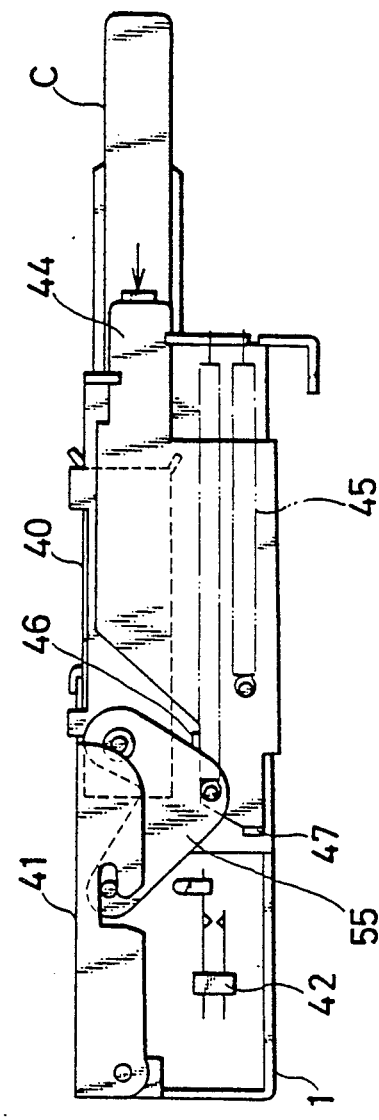
FIG. 12 is a view similar to FIG. 7, showing the state in which the tape cassette is ejected.

Then when ejection operating member 44 is depressed against the bias of the return spring 45 in the position of FIG. 11, the cam projection 52 pushes back the head mounting plate 38 (FIG. 8). Subsequently, as shown in FIG. 12, the push-up member 46 on the ejection operating member 44 pushes the cassette holder 40 to the cassette inserting and removing position via a cooperating plate 55 and the connection plate 41, and then the cassette C within the cassette holder 40 is pushed back in the direction of removal by a non-illustrated push-back means.

If the operator's hand is released from the ejection operating member 44, the ejection operation member 44 is slightly returned under the bias of the return spring 45. During that time, since the movable member 43 is returned to the original position, the claw projection 47 is brought in engagement with the locking means 48, as shown in FIG. 7, to thereby inhibit the returning of the ejection operation member 44. Therefore the head mounting plate 38 is held in a inoperative position by the cam projection 52 and then is ready for the next cassette insertion.

As discussed above in detail, according to this invention, it is possible to automatically eliminate any possible slack in the tape to start the reproducing action, simply by loading the tape cassette, namely, not requiring the user's special operation.

What is claimed is:

1. A tape recorder with an automatic pre-reproduction tape slack eliminating function, comprising:
   a cassette holder movable between a cassette inserting and removing position whereat insertion and removal of a tape cassette is permitted and a cassette loading position where the tape cassette is positioned at a reproducing position,
   a tape driving motor actuated responsive to movement of the cassette holder from the cassette inserting and removing position toward the cassette loading position,
   a head mounting plate supporting a magnetic head thereon and reciprocally movable between a stop position where the magnetic head is maintained apart from the tape of the tape cassette and a engaged position where the magnetic head is maintained in contact with the tape of the tape cassette located at the reproducing position,
   a resilient member normally biasing said head mounting plate toward the engaged position,
   first and second reel spindles arranged in a pair, each of said first and second reel spindles having a lower portion,
   first and second reel gears, said first reel gear being affixed at said lower portion of said first reel spindle and said second reel gear being affixed at said lower portion of said second reel spindle,
   a rotation transmitting means for selectively establishing one of rotation transmitting routes, which extend from the motor to said first and second reel spindles, respectively, upon movement of said head mounting plate from the stop position to the engaged position,
   a braking means engageable with said first reel gear to inhibit rotation of the corresponding first reel spindle,
   a locking means for holding said head mounting plate at the stop position,
   a slack eliminating gear driven by the motor,
   a movable member rotatably supporting the slack eliminating gear thereon to transmit rotation of the slack eliminating gear to said second reel gear, said movable member holding said locking means at a position where said locking means is engageable with the head mounting plate and said braking means at a position where said braking means is engageable with said first reel gear, said movable member being moved in a direction to cut off said rotation transmitting route from the slack eliminating gear to said second reel gear upon reception of a reaction force from said second reel gear, said reaction force being produced responsive to the stopping of the second reel gear when any slack of the tape has been eliminated, whereby the holding of the head mounting plate by said locking means is released and said braking means is separated from said first reel gear, and
   a movable member control means provided on said head mounting plate, said control means causing said movable member to substantially move further in said direction responsive to movement of said head mounting plate to the engaged position but causing said movable member to return to an initial position responsive to movement of said head mounting plate to the stop position.

2. The tape recorder according to claim 1, wherein said locking means and said braking means are formed on a common plate which is operatively engaged with said movable member.

3. The tape recorder according to claim 1, wherein said braking means is formed on said head mounting plate.

4. A tape recorder with an automatic pre-reproduction tape slack eliminating function, comprising:
   a cassette holder movable between a cassette inserting and removing position whereat insertion and removal of a tape cassette and a cassette is permitted and a cassette loading position where the tape cassette is positioned at a reproducing position,
   a tape driving motor driven responsive to movement of the cassette holder from the cassette inserting and removing position toward the cassette loading position,
   a head mounting plate supporting a magnetic head thereon and reciprocally movable between a stop position where the magnetic head is maintained apart from the tape of the tape cassette and an engaged position where the magnetic head is maintained in contact with the tape of the tape cassette located at the reproducing position,
   an eject operation member movable forward by an eject operation, thereby pushing back the head mounting plate from the engaged position to the stop position and also moving the cassette holder from the cassette loading position to the cassette inserting and removing position,
   a return spring for moving the eject operation member backward,
   a resilient member normally biasing the head mounting plate toward the engaged position,
   first and second reel spindles arranged in a pair, each of said first and second reel spindles having a lower portion,
   first and second reel gears, said first reel gear being affixed at said lower portion of said first reel spindle and said second reel gear being affixed at said lower portion of said second reel spindle,
   a rotation transmitting means for selectively establishing one of rotation transmitting routes, which extend from the motor to the first and second reel spindles, respectively, upon movement of the head mounting plate from the stop position to the engaged position,
   a braking means engageable with the first reel gear to inhibit rotation of the corresponding first reel spindle,
   a locking means for preventing backward movement of the eject operation member,
   a slack eliminating gear driven by the motor, a movable member rotatably supporting the slack eliminating gear thereon to transmit rotation of the slack eliminating gear to said second reel gear, said movable member holding said locking means at a position where said locking means is engageable with the eject operation member and said braking means at a position where said braking means is engageable with said first reel gear, said movable member being moved in a direction to cut off the rotation transmitting route from the slack eliminating gear to said second reel gear upon reception of a reaction force from said second reel gear, said reaction force being produced responsive to the stopping of said second reel gear when any slack of the tape has been eliminated, whereby the holding of the eject operation member by said locking means is released and said braking means is separated from said first reel gear, and a movable member control means provided on the eject operation member, said eject operation member causing said movable member to substantially move further in said direction responsive to movement of said head mounting plate to the engaged position but causing said movable member to return to an initial position responsive to movement of said head mounting plate to the stop position.

5. The tape recorder according to claim 4, wherein said braking means is formed on said head mounting plate.

6. A tape recorder with an automatic pre-reproduction tape slack eliminating function, comprising:

a cassette holder movable between a cassette inserting and removing position whereat insertion and removal of a tape cassette is permitted and a cassette loading position where the tape cassette is positioned at a reproducing position, a tape driving motor actuated responsive to movement of the cassette holder from the cassette inserting and removing position toward the cassette loading position, a head mounting plate supporting a magnetic head thereon and reciprocally movable between a stop position where the magnetic head is maintained apart from the tape of the tape cassette and a engaged position where the magnetic head is maintained in contact with the tape of the tape cassette located at the reproducing position, a resilient member biasing the movement direction of said head mounting plate in a movement direction along an axis between the stop position and the engaged position, first and second reel spindles arranged in a pair, each of said first and second reel spindles having a lower portion, first and second reel gears, said first reel gear being affixed at said lower portion of said first reel spindle and said second reel gear being affixed at said lower portion of said second reel spindle, a rotation transmitting means for selectively establishing one of rotation transmitting routes, which extend from the motor to said first and second reel spindles, respectively, upon movement of said head mounting plate from the stop position to the engaged position, a braking means engageable with said first reel gear to inhibit rotation of the corresponding first reel spindle, a locking means for holding said head mounting plate at the stop position, a slack eliminating gear driven by the motor, a movable member rotatably supporting the slack eliminating gear thereon to transmit rotation of the slack eliminating gear to said second reel gear, said movable member holding said locking means at a position where said locking means is engageable with the head mounting plate and said braking means at a position where said braking means is engageable with said first reel gear, said movable member being moved in a direction to cut off said rotation transmitting route from the slack eliminating gear to said second reel gear upon reception of a reaction force from said second reel gear, said reaction force being produced responsive to the stopping of the second reel gear when any slack of the tape has been eliminated, whereby the holding of the head mounting plate by said locking means is released and said braking means is separated from said first reel gear, and a movable member control means provided on said head mounting plate, said control means causing said movable member to substantially move further in said direction responsive to movement of said head mounting plate to the engaged position but causing said movable member to return to an initial position responsive to movement of said head mounting plate to the stop position.

7. The tape recorder according to claim 6, wherein said locking means and said braking means are formed on a common plate which is operatively engaged with said movable member.

8. The tape recorder according to claim 6, wherein said braking means is formed on said head mounting plate.

9. A tape recorder with an automatic pre-reproduction tape slack eliminating function, comprising:

a cassette holder movable between a cassette inserting and removing position whereat insertion and removal of a tape cassette and a cassette is permitted and a cassette loading position where the tape cassette is positioned at a reproducing position, a tape driving motor driven responsive to movement of the cassette holder from the cassette inserting and removing position toward the cassette loading position, a head mounting plate supporting a magnetic head thereon and reciprocally movable between a stop position where the magnetic head is maintained apart from the tape of the tape cassette and an engaged position where the magnetic head is maintained in contact with the tape of the tape cassette located at the reproducing position, an eject operation member movable forward by an eject operation, thereby pushing back the head mounting plate from the engaged position to the stop position and also moving the cassette holder from the cassette loading position to the cassette inserting and removing position, a return spring for moving the eject operation member backward, a resilient member biasing the movement direction of the head mounting plate in a movement direction along an axis between the stop position and the engaged position, first and second reel spindles arranged in a pair, each of said first and second reel spindles having a lower portion, first and second reel gears, said first reel gear being affixed at said lower portion of said first reel spindle and said second reel gear being affixed at said lower portion of said second reel spindle, a rotation transmitting means for selectively establishing one of rotation transmitting routes, which extend from the motor to the first and second reel spindles, respectively, upon movement of the head mounting plate from the stop position to the engaged position, a braking means engageable with the first reel gear to inhibit rotation of the corresponding first reel spindle, a locking means for preventing backward movement of the eject operation member, a slack eliminating gear driven by the motor, a movable member rotatably supporting the slack eliminating gear thereon to transmit rotation of the slack eliminating gear to said second reel gear, said movable member holding said locking means at a position where said locking means is engageable with the eject operation member and said braking means at a position where said braking means is engageable with said first reel gear, said movable member being moved in a direction to cut off the rotation transmitting route from the slack eliminating gear to said second reel gear upon reception of a reaction force from said second reel gear, said reaction force being produced responsive to the stopping of said second reel gear when any slack of the tape has been eliminated, whereby the holding of the eject operation member by said locking means is released and said braking means is separated from said first reel gear, and a movable member control means provided on the eject operation member, said eject operation member causing said movable member to substantially move further in said direction responsive to movement of said head mounting plate to the engaged position but causing said movable member to return to an initial position responsive to movement of said head mounting plate to the stop position.

10. The tape recorder according to claim 9, wherein said braking means is formed on said head mounting plate.

* * * * *